T. S. BROWN.
HORSE-RAKE.
No. 174,113.  Patented Feb. 29, 1876.
Fig: 1
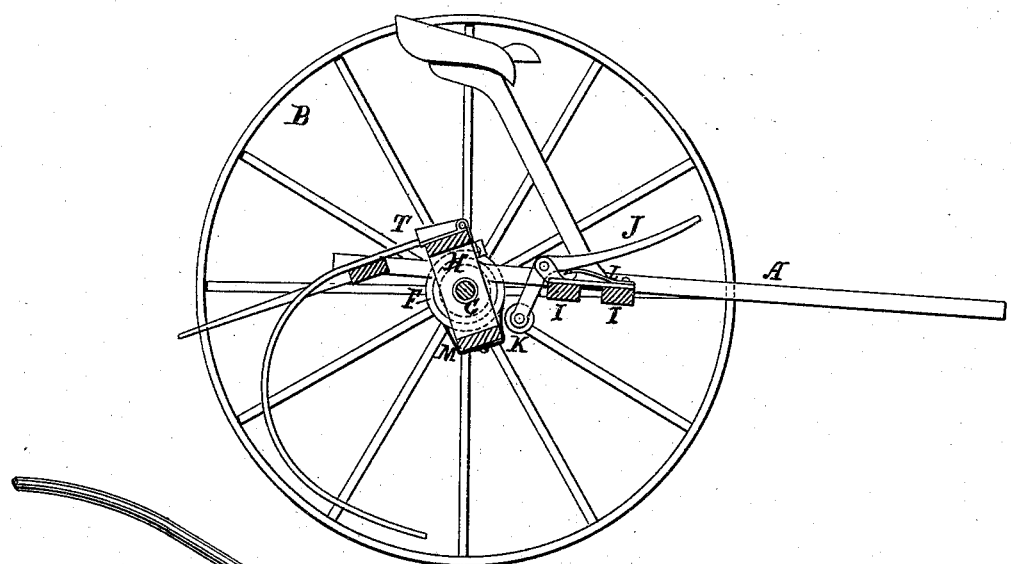
Fig: 2
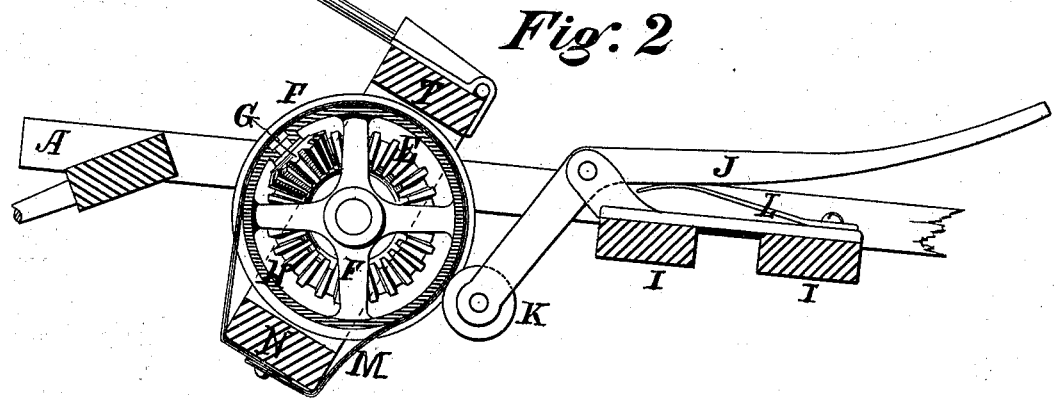
Fig: 3
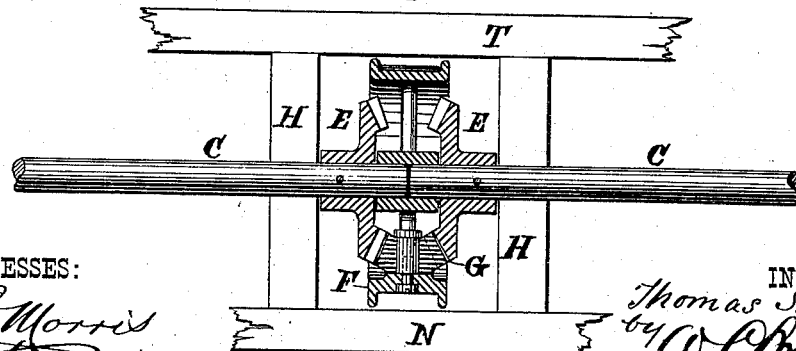
WITNESSES:
O. P. Morris
J. Bonsall Taylor.
INVENTOR.
Thomas S. Brown
by A. C. Strawbridge,
ATTORNEY.

UNITED STATES PATENT OFFICE.

THOMAS S. BROWN, OF POUGHKEEPSIE, NEW YORK, ASSIGNOR OF ONE-HALF HIS RIGHT TO JOHN P. ADRIANCE, OF SAME PLACE.

IMPROVEMENT IN HORSE-RAKES.

Specification forming part of Letters Patent No. 174,113, dated February 29, 1876; application filed December 31, 1875.

*To all whom it may concern:*

Be it known that I, THOMAS S. BROWN, of Poughkeepsie, in the county of Dutchess and State of New York, have invented a new and useful Improvement in Horse Hay-Rakes, of which the following is a specification:

Figure 1 is a sectional side elevation of my rake; Fig. 2, a partial side section of the band-wheel, friction-roller lever, and differential gearing; and Fig. 3, a central longitudinal section of the same.

The same letters denote the same parts in all the figures.

The nature of my invention consists in the combination and arrangement of the devices herein set forth and claimed.

The construction of those devices is as follows:

A is the shaft; B, the wheel; and C the centrally-divided axle, set in bearings upon the shafts, to either outer extremity of which each wheel is keyed. E E are bevel cog-wheels, keyed to the inner ends of each half of the axle, and facing toward one another. F is a flanged band-wheel, free to rotate upon the innermost extremities of both halves of the axle. Upon the inner side of the periphery of this band-wheel, and pivoted to it, is a pinion, G, which engages with both bevel-wheels, as shown in Fig. 3, the whole device forming a differential gearing for the wheels. Pivoted upon the axle, and free to vibrate about it under ordinary circumstances, is a rectangular frame-work, H, the upper cross-piece of which is the rake-head T. Located upon cross-braces I, set upon the shafts, and directly in front of the band-wheel, is the friction-roller lever J, carrying at its lower bent extremity the friction-roller K. L is a spring, which, ordinarily, keeps the foot-piece of the lever elevated, and the roller, consequently, away from the band-wheel. Surrounding the flanged band-wheel loosely is a band, M, of leather, gum, metal, or other suitable material, attached to the lower cross-piece N of the frame-work H.

Such being the construction of my device, its mode of operation is as follows:

When driven forward in a straight line, the force and speed from each road-wheel upon the bevel-wheels being the same, the pinion is held stationary between the bevel-wheels, and by them is carried around, consequently rotating with it the band-wheel, which slips readily over its band. In this position the rake-teeth are down and raking. When it is desired to lift them, the foot of the driver depresses the foot-lever, brings the friction-roller in hard contact with the band, whereby the band-wheel itself is clutched by the band, and the band, with its attached frame-work H, carried around or rotated forward upon the axle, upon which it pivots, in the direction of, and by, the band-wheel as the rake advances, the rakes being elevated in consequence, the friction-band, while thus clutched upon the band-wheel, sliding over the friction-roller, which rotates under it. When the foot is removed from the lever, the rake drops by its weight. When the rake is turned around the differential gearing allows free play to both wheels without shock or strain, the power being always divided between them in exact proportion to their relative speed.

The principal advantages of my rake are that the rake is operated to discharge its load by an easy and uniform pressure upon the operating device, without a straining effort, to which is added advantages of a central application of power between the wheels, and simultaneous action of the wheels, producing a steady movement of the machine.

Having thus described my invention, I claim, and desire to secure by Letters Patent of the United States—

1. The combination of the dividing axle C, the bevel-wheels E E, the pinion G, the band-wheel F, the band M, the frame-work H, and the friction-roller lever J and roller K, the whole forming a differentially-geared lifting and dropping device for horse hay-rakes, substantially as described.

2. The friction-roller lever J and its roller K, in combination with the frame work H, the band-wheel F, and the band M, the whole forming a lifting and dropping device for horse-rakes, as described.

THOS. S. BROWN.

Witnesses:
WM. WOODIN,
JNO. E. ADRIANCE.